(12) United States Patent
Kano et al.

(10) Patent No.: US 7,242,534 B2
(45) Date of Patent: Jul. 10, 2007

(54) LENS UNIT AND A CAMERA INCORPORATING THE SAME LENS UNIT

(75) Inventors: Mitsuo Kano, Akishima (JP); Yoshito Katagiri, Hachioji (JP)

(73) Assignee: Konica Minolta Photo Imaging, Inc., Tokyo (JP)

( * ) Notice: Subject to any disclaimer, the term of this patent is extended or adjusted under 35 U.S.C. 154(b) by 0 days.

(21) Appl. No.: 11/174,770

(22) Filed: Jul. 5, 2005

(65) Prior Publication Data
US 2006/0012887 A1    Jan. 19, 2006

(30) Foreign Application Priority Data
Jul. 13, 2004   (JP) .............................. 2004-205712

(51) Int. Cl.
*G02B 15/14* (2006.01)
*G02B 7/02* (2006.01)

(52) U.S. Cl. ...................................... 359/694; 359/819

(58) Field of Classification Search ................ 359/694, 359/699, 700, 819, 822, 823
See application file for complete search history.

(56) References Cited

U.S. PATENT DOCUMENTS 5,680,255 A * 10/1997 Imanari ....................... 359/701

5,995,302 A * 11/1999 Ito .............................. 359/700
6,031,998 A   2/2000 Shono .......................... 396/75
6,778,335 B2 * 8/2004 Takanashi .................... 359/704

FOREIGN PATENT DOCUMENTS

| JP | 11-109203 | 4/1999 |
| JP | 11-258676 | 9/1999 |
| JP | 2003-149723 | 5/2003 |

* cited by examiner

*Primary Examiner*—David Spector
*Assistant Examiner*—M. Hasan
(74) *Attorney, Agent, or Firm*—Cohen Pontani Lieberman & Pavane LLP (57) ABSTRACT

A lens unit in which at least one of a subject side lens group and an image side lens group is moved toward an image side to be retracted along an optical axial direction, including a subject side lens group supporting frame to support the subject side lens group, an image side lens group supporting frame to support the image side lens group, a guide member to guide the image side lens group supporting frame from a predetermined position on the subject side to the image side by a predetermined length in parallel to an optical axis, and a moving and displacing device to move the image side lens group supporting frame from the predetermined position on the subject side to the image side by length longer than the predetermined length in parallel to the optical axis, and displace the image side lens group supporting frame from an optical path.

7 Claims, 6 Drawing Sheets

LENS UNIT AND A CAMERA INCORPORATING THE SAME LENS UNIT

This application is based on Japanese Patent Application No. 2004-205712 filed on Jul. 13, 2004 in Japanese Patent Office, the entire content of which is hereby incorporated by reference.

BACKGROUND OF THE INVENTION

The present invention relates to a lens unit used for a camera, and in particular, to the lens unit which is retractable to become compact while carried, and to a camera having the same lens unit.

In the past, a great number of compact cameras which users can more easily carry, are well known, wherein the lens unit protrudes for photographing, and retracts to a compact size for not photographing.

However, even though the lens unit is retracted along the optical axis to minimize the clearance between each lens, it is impossible to retract the lens unit to less than the summation of the thickness of all lenses and the retracted clearance between adjacent lenses. In order to overcome this problem, proposed is a specific lens and an image pickup device which are moved out of the optical axis, and other lens groups are retracted along the optical axis so that the thickness of the lens unit is reduced when the lens unit is retracted.

As such cameras, disclosed is one in which the image pick up device is moved out of the optical path, and the lens groups are retracted along the optical axis, or another camera is disclosed which incorporates a lens unit whose backmost lens group and image pickup device are integrally moved from the optical path. (Patent Documents 1 and 2)

Further, disclosed is a camera wherein among three lens groups within the lens units, the third lens group as the backmost is used for focusing and is pivoted 180 degrees about a supporting shaft for the movement, while the first and the second lens groups are retracted along the optical axis (Patent Document 3).

[Patent Document 1] Unexamined Japanese Patent Publication 11-258676
[Patent Document 2] Unexamined Japanese Patent Publication 11-109203
[Patent Document 3] Unexamined Japanese Patent Publication 2003-149723

Concerning cameras using an image pickup device, the size of the surface of the image pickup device is about ⅓-½ inches, which is less than the film frame of a camera using silver film. Accordingly, though the maximum aperture F of an image capturing lens of the camera using the image pickup device is already very small, the camera can be downsized still further. However, due to this, the tolerable error margins of the image capturing lens becomes dramatically less than the conventional silver halide cameras.

The cameras disclosed in Patent Documents 1 and 2 feature a method in which the image pickup device is moved for focusing, and it is very difficult to correctly determine the stopping position of the image pickup device along the optical axis with high repeatability. When the optical axial position of the image pickup device fluctuates, the focusing lenses cannot be reliably controlled, which is of course unacceptable.

In order to move the lens groups outside the optical axis, the camera disclosed in Patent Document 3 features a method in which a specific gear is mounted on an arm section of the lens frame, another gear engaging the specific gear is driven so that the lens group rotates about a shaft passing through the arm section, and thereby, the lens group is moved. According to this structure, a specific actuator is employed so that the lens group, which is to be moved outside the optical axis, can be driven for focusing along the optical axis. To employ two actuators, the mechanical space must be enlarged whereby the production cost increases, and additionally, there remains the major problem of determining the optical axial position of the lens group being moved.

SUMMARY OF THE INVENTION

In consideration of the above problems, in the lens unit structured in such way that at least one lens group is moved from the optical path and the other lens groups are shifted toward the optical path and shortened so that the lens unit is retracted, an object of the present invention is to obtain a lens unit wherein a predetermined lens group can be moved from the optical path, as well as the lens unit is shortened, when the lens unit is retracted, without changing the structure of the conventional lens unit, that is, not using a new actuator and a new mechanical space, nor increasing the production cost.

The above object is solved by the structures described below.

Structure 1

A lens unit, structured in such way that at least one lens group is displaced from the optical path and other lens groups are shifted along the optical path and shortened, when the lens unit is retracted, wherein the frame supporting the lens group to be moved from the optical path, is engaged with a lead screw, and shifts along the optical axial direction, guided by a guide member installed nearly parallel to the optical axis, and further, the frame is rotated by the lead screw at a blank section of the guide member.

Structure 2

In the lens unit in structure 1, the lens group to be displaced from the optical path is used for focusing.

Structure 3

In the lens unit in structure 1 or 2, the lens group to be displaced from the optical path is structured in such way that the lens group moves from the optical path at the position between the area for image capturing and the focal plane.

Structure 4

A camera including the lens unit in any one of structures 1-3.

Structure 5

The lens unit in structure 1, wherein the subject side lens group is retracted into a space from which the image side lens group has been displaced.

DETAILED DESCRIPTION OF THE PREFERRED EMBODIMENTS

The present invention will be detailed below using the embodiments, however the present invention is not limited to the explanations described below.

Figure 1A:
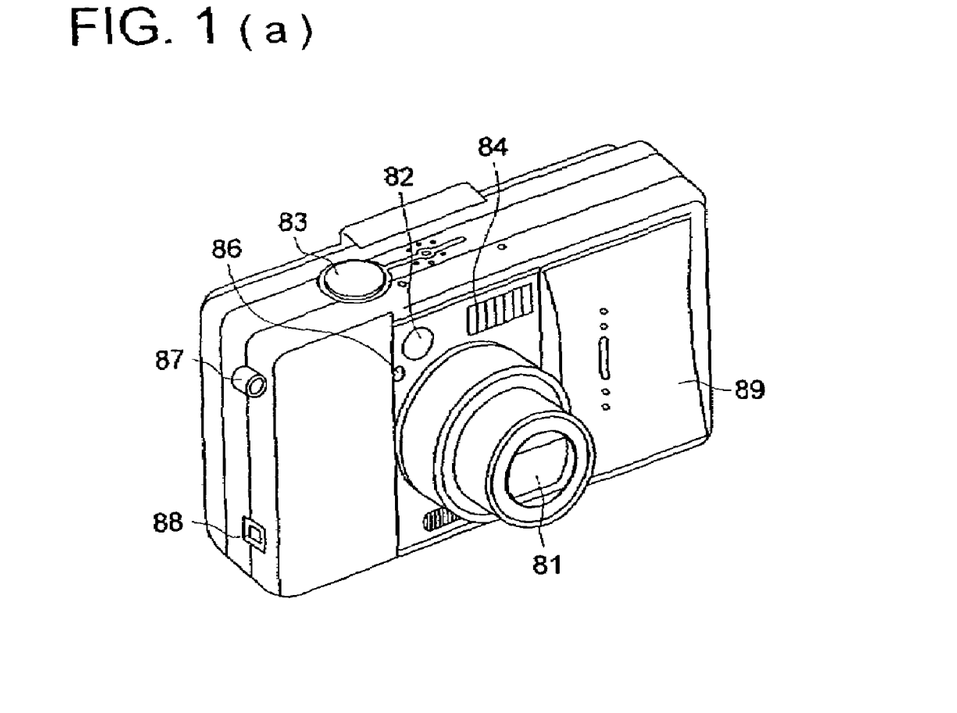
FIGS. 1(a) and 1(b) are exterior views of a camera incorporating the lens unit, relating to the present invention.
Figure 1B:
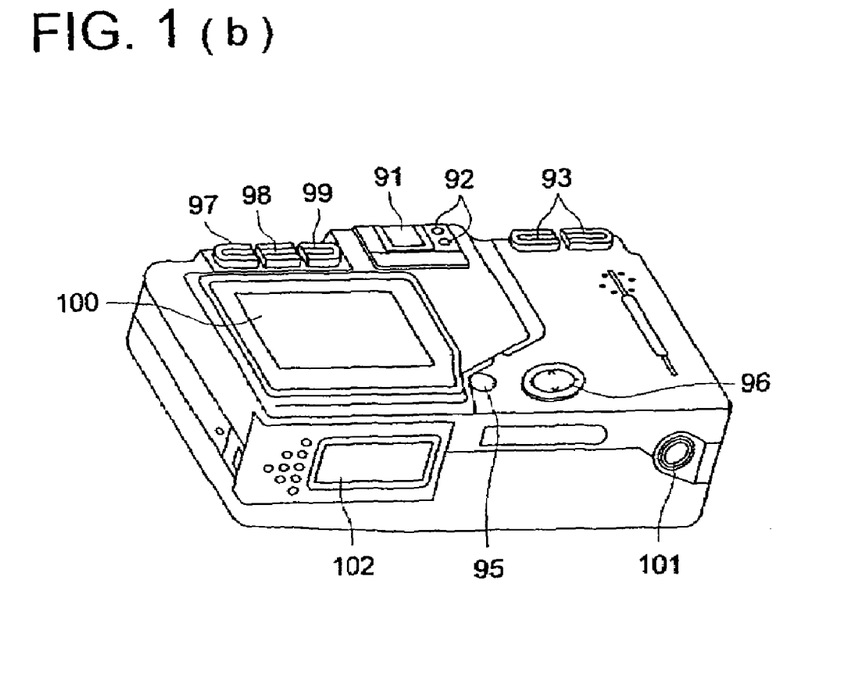

FIGS. 1(a) and 1(b) show the exterior view of a camera incorporating the lens unit relating to the present invention. FIG. 1(a) is a perspective view of the front, top and right side of the camera. FIG. 1(b) is a perspective view of the rear, bottom and left side of the camera.

In FIG. 1(a), numeral 81 is the lens unit, numeral 82 is the view finder window, numeral 83 is the shutter release button, numeral 84 is the flash section, numeral 86 is the light measuring sensor, numeral 87 is the carrying strap anchor, and numeral 88 is the input/output terminal (for example, a USB terminal) for exterior connection. Numeral 89 is the lens cover. When the camera is not used, lens unit 81 is retracted, and lens cover 89 is moved to cover lens unit 81. In the camera of the present embodiment, the main switch is turned on or off via movement of lens cover 89.

When shutter release button 83 is depressed half way (hereinafter referred to as an "ON of switch S1"), preparative operations of image capturing, such as focusing or light measuring, are conducted, and when shutter release button 81 is fully depressed (hereinafter referred to as an "ON of switch S2"), image capturing is conducted.

In FIG. 1(b), numeral 91 is the eyepiece section of the view finder, numerals 92 are red and green display lamps, which show information of AF (auto focus) and AE (automatic exposure) to the user, by continuously lighting or blinking. Numeral 93 are the zoom buttons for zooming in or zooming out on the targeted image. Numeral 95 is the function setting button, numeral 96 is the four-mode selection button, numeral 100 is the image display section for displaying image or textual information. Various menus are displayed on image display section 100 when the user presses function setting button 95, and the targeted function is selected from among the various options via function setting button 95. Numeral 97 is a reproduction button to view captured images. Numeral 98 is a display button to select display operation or erase operation of the displayed image or textual information shown on display section 100. Numeral 99 is a button to erase desired captured images. Numeral 101 is the tripod socket hole, numeral 102 is the cover for the battery and a memory card. Behind battery/card cover 102, spaces are provided for housing the battery which supplies electric power to the camera, and the memory card which memorizes the captured images, and thereby, the detachable card type recording memory device, which stores the captured images is incorporated.

Figure 2:
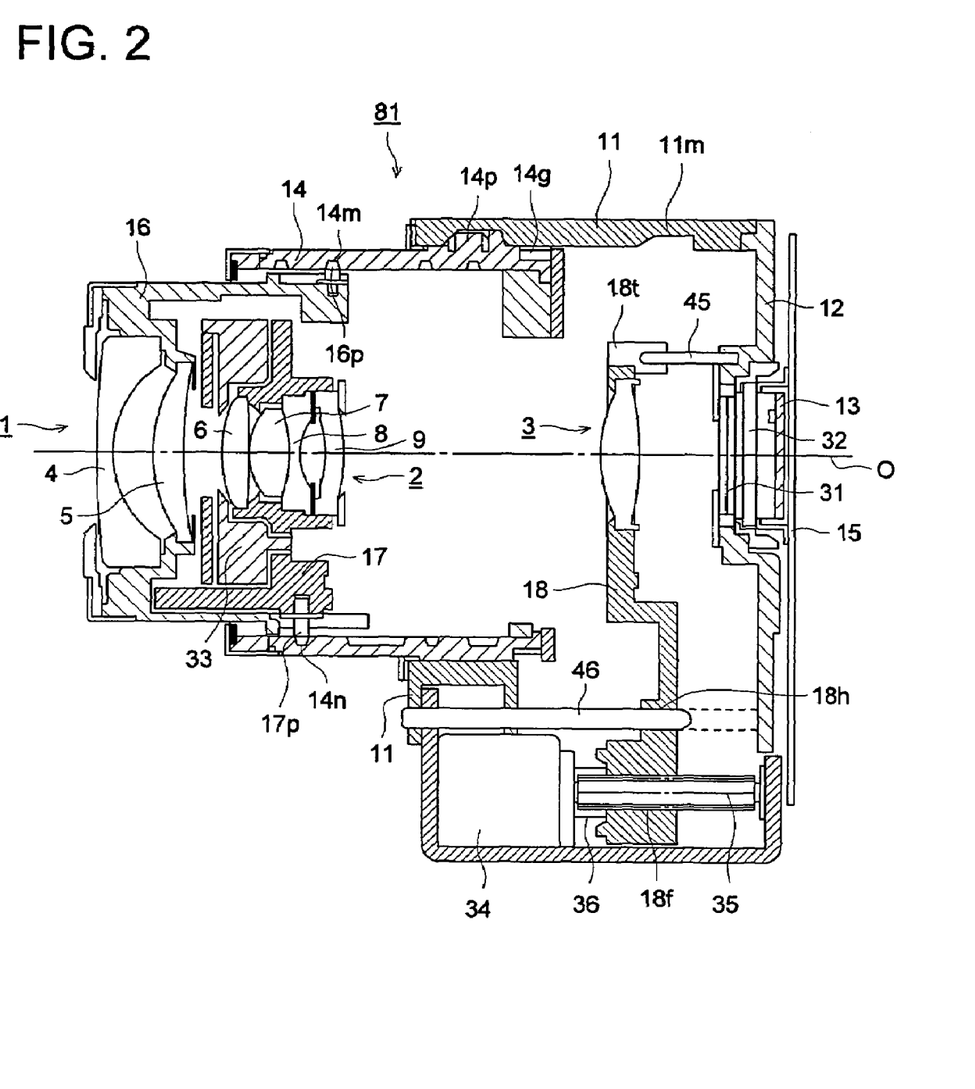
FIG. 2 is a general cross sectional view of the lens unit when used for capturing photo images, relating to the present invention.

FIG. 2 is a general sectional view showing the image capturing configuration of lens unit 81 related to the present invention. Lens unit 81, as a zoom optical system shows the telescopic configuration. In the explanations below, the same members in each figure are shown by the same numerals, to prevent overlapping.

In FIG. 2, numeral 1 is the first lens group, first lens group 1 is structured of lenses 4 and 5, both of which move as an integral unit. Numeral 2 is the second lens group, second lens group 2 is structured of lenses 6 to 9, all of which also move as an integral unit. Numeral 3 is the third lens group, that is, lens unit 81 is structured of three lens groups. For zooming, first lens group 1 and second lens group 2 are moved on the optical axis for varying degrees of magnification, while third lens group 3 is moved on the optical axis for focusing.

Numeral 11 is the fixed barrel, which is mounted integrally into the camera's main body which is not specifically illustrated. Back wall 12 forms the back of fixed barrel 11. Optical filter 31, onto which an optical low pass filter and an infrared filter are laminated, and image pickup device 32 are mounted on back wall 12. Image pickup device 32 is fixed onto supporting member 13, and supporting member 13 is screwed onto back wall 12 so that image pickup device 32 is secured. Numeral 15 is the printed circuit board, which is electrically connected to image pickup device 32.

Numeral 14 is the cam barrel, and cam pin section 14p, engaging cam groove 11m formed in fixed barrel 11, is formed on the interior surface of cam barrel 14, and in addition, partial gear 14g is also formed on a rear section of cam barrel 14. Further, cam grooves 14m and 14n are formed on the inner circumferential plane of cam barrel 14, additionally, cam groove 14m engages cam pin 16p mounted on first lens frame 16, while cam groove 14n engages cam pin 17p mounted on second lens frame 17.

Partial gear 14g, formed on cam barrel 14, is engaged with an idler gear, which is not illustrated, and the idler gear is connected to a group of reduction gears and a zooming motor, which are not illustrated. By these structures, the rotation of the zooming motor is transferred to cam barrel 14 so that cam barrel 14 rotates and moves along optical axis "O", due to the mutual engagement of cam groove 14m and cam pin section 14p mounted on fixed barrel 11.

First lens frame 16 and second lens frame 17 cannot rotate due to a straight guide member, which is not illustrated, both of which are guided by cam grooves 14m and 14n and driven along optical direction O due to the rotation of cam barrel 14, whereby the distance between first lens frame 16 and second lens frame 17 changes. That is, both first lens frame 16 which secures first lens group 1 and second lens frame 17 which secures second lens group 2 are moved by cam barrel 14 so that they perform the magnification/reduction of the image. Additionally, the rotation angle of cam barrel 14 is detected and controlled by a well-known rotation angle detection device. Numeral 33 is a diaphragm and shutter unit, which is fixed on second lens frame 17.

A stopper guide member, such as guide shaft 45, is mounted on back wall 12, basically parallel to optical axis O. A guide member such as guide shaft 46, which is a straight guide member, is held on one side and mounted on fixed barrel 11, basically parallel to optical axis O. As shown in FIG. 2, guide shaft 46 does not come into contact with back wall 12, maintaining a clearance between one end of guide shaft 46 and back wall 12. The clearance (shown by dotted lines) is hereinafter referred to as "a blank section" for the explanation.

Concerning third lens frame 18 as a mounting frame of third lens group 3, under the image capturing configuration as shown in FIG. 2, guide shaft 46 passes through a through hole 50 formed in third lens frame 18, while projection section 18t, formed on third lens frame 18, comes into contact with guide shaft 45.

Further, an engaging section such as lead screw 35 which is mounted on the rotating shaft of driving section such as focusing motor 34, which is structured as a stepping motor or the like, engages third lens frame 18. By the rotation of focusing motor 34, within the area where third lens frame 18 engages guide shaft 46, third lens frame 18 moves in the optical axis. Numeral 36 is the compression spring which presses third lens frame 18 in one direction to reduce back-lash.

Next, to be explained will be the movement along the optical axis, the separation from the optical path and the re-entry into the optical path, of third lens frame 18 which supports third lens group 3.

Figure 3:
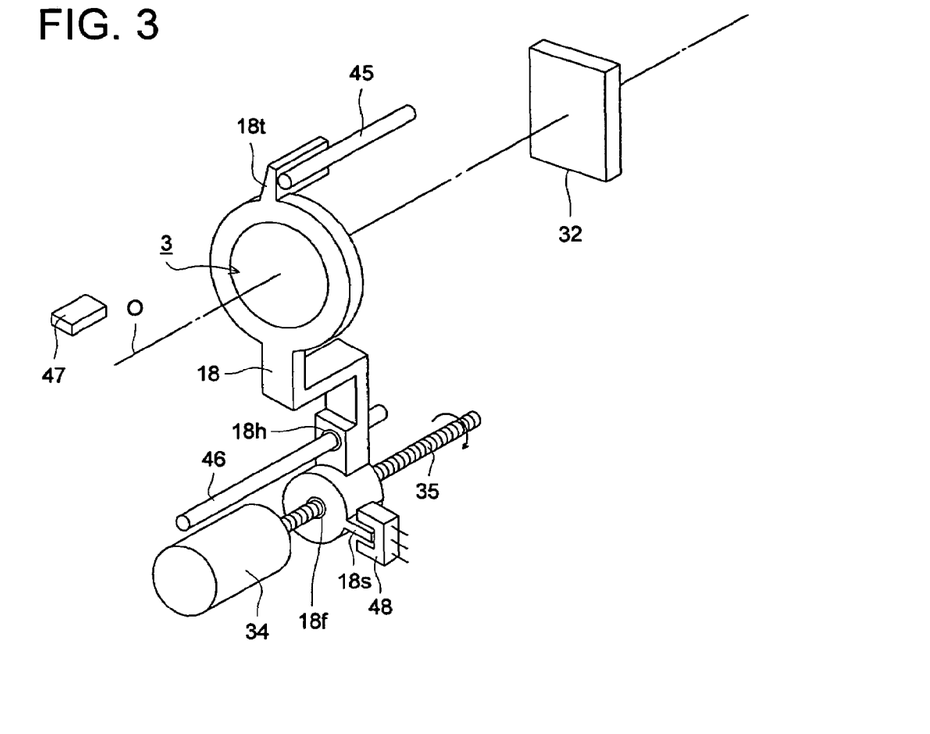
FIG. 3 is a perspective view of the third lens frame which locates on the optical path.

FIG. 3 is a perspective view of third lens frame 3 which is positioned in the optical path. Compression spring 36 is not illustrated.

In FIG. 3, when lead screw 35 is rotated by focusing motor 34, third lens frame 18 is shifted along optical axis "O", while sliding on guide shaft 46. In order to stop the movement of third lens frame 18, it is preferable that lead screw 35, as a right-hand threaded screw, is firstly rotated in the direction indicated by the arrow in FIG. 3, after which, lead screw 35 is controlled to stop the rotation. That is, in order to shift third lens frame 18, which supports third lens group 3, in the right hand direction in FIG. 3, lead screw 35 is controlled to mainly rotate and additionally rotate for a predetermined amount in the direction opposite to the direction indicated by the arrow, so that third lens frame 18 advances in the left hand direction, after which, lead screw 35 is controlled to rotate for a predetermined amount in the direction indicated by the arrow so that third lens frame 18 gets back. On the other hand, in order to shift third lens frame 18 toward the left in FIG. 3, lead screw 35 is controlled to rotate in the direction indicated by the arrow, after which, lead screw 35 is precisely controlled to stop. Thereby, while projection section 18t of third lens frame 18 comes into contact with guide shaft 45, third lens frame 18 can be stopped and correctly positioned on optical axes "O".

Next, the displacement of third lens frame 18 from the optical path will be explained.

In FIG. 3, lead screw 35 is controlled to rotate opposite the direction indicated by the arrow. Thereby, third lens frame 18 shifts toward the right where the image surface of image pickup device 32 (see FIG. 2) exists. When third lens frame 18 comes to the blank section of guide shaft 46, third lens frame 18 is separated from guide shaft 46, serving as a guide member, and is pivoted opposite the direction indicated by the arrow around lead screw 35, while engaging said lead screw 35, so that third lens group 18 is displaced from the optical path.

Figure 4:
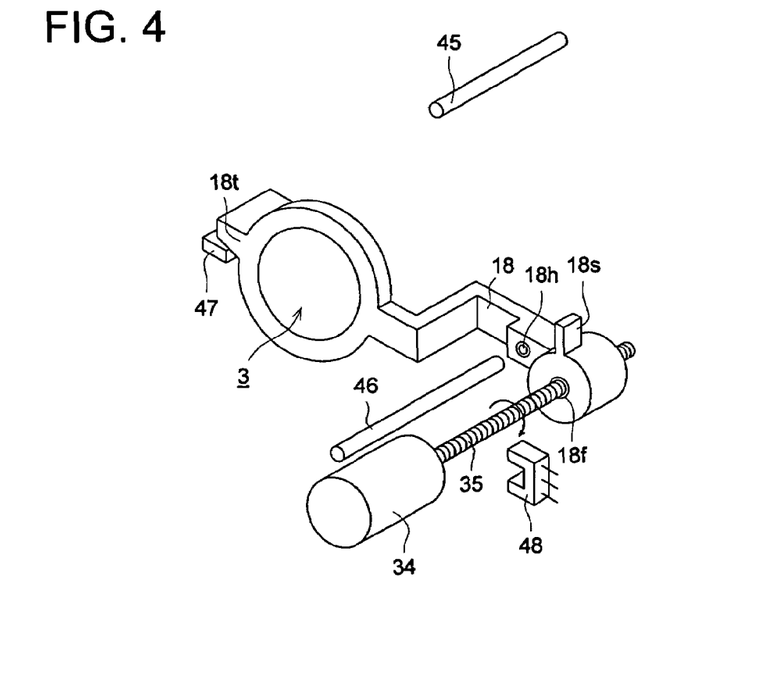
FIG. 4 is a perspective view of the third lens frame moved from the optical path.

FIG. 4 is a perspective view of the configuration of third lens frame 18 which is shown displaced from the optical path. That is, while engaging lead screw 35, third lens frame 18 was rotated to displace from the optical path, and then projection section 18t came into contact with stopper 47, which stopped the rotation of third lens frame 18.

In order to return third lens frame 18 from the above configuration toward the configuration located in the optical path, as shown in FIG. 3, lead screw 35 is controlled to rotate in the direction indicated by the arrow in the configuration shown in FIG. 4. Due to this, third lens frame 18 is placed into the optical path while engaging with lead screw 35, causing projection section 18t to come into contact with guide shaft 45 so that third lens frame 18 is stopped to rotate positioned within the optical path. Further, rotation of lead screw 35 in the direction indicated by the arrow further shifts third lens frame 18 toward focusing motor 34, that is, toward the subject being photographed, after which third lens frame 18 engages with guide shaft 46, whereby the configuration shown in FIG. 3 is realized, which is position for image capturing.

Additionally, as shown in FIG. 3, the shifted amount of third lens frame 18 is controlled based on the position where plate 18s, which is formed as a position detecting member on third lens frame 18, opens and closes the light emitting/receiving position of photo-interrupter 48. That is, the shifted direction and distance from the base position are previously measured and determined for each lens unit.

Third lens frame 18 is displaced from and replaced into the optical path, and moves along the optical path for focusing according to the above procedures.

Figure 5:
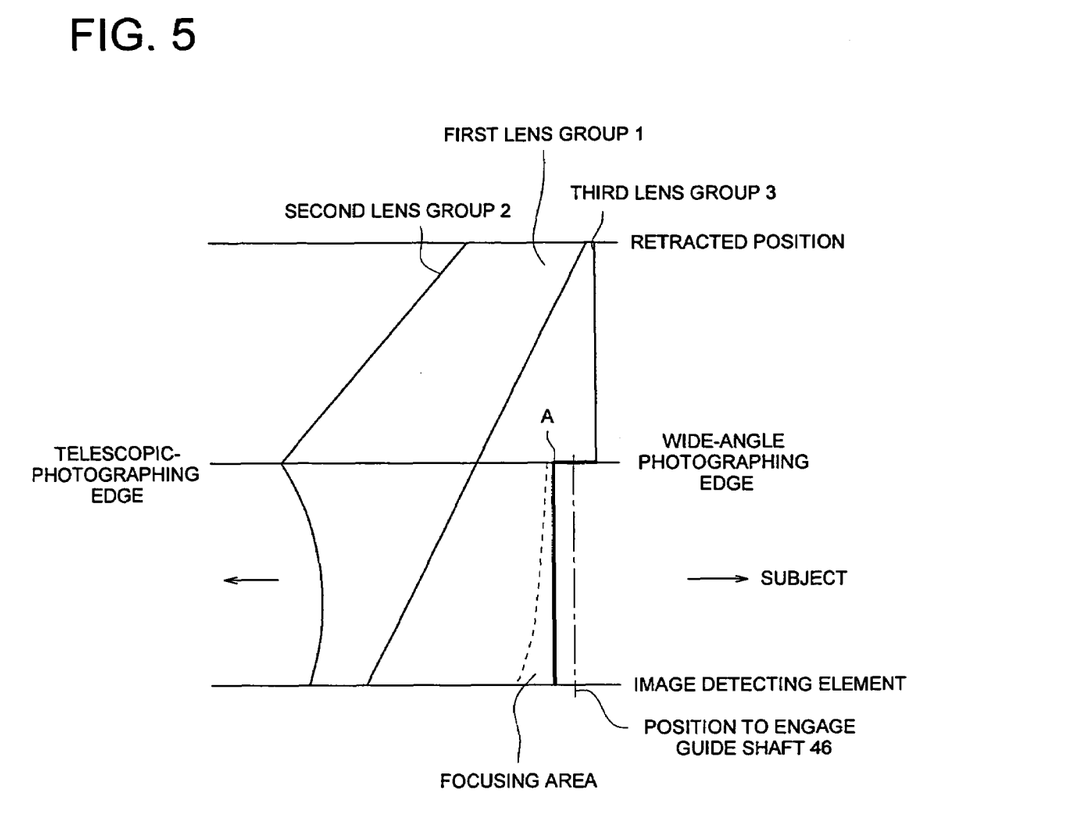
FIG. 5 shows the positional relationship of the first lens group, the second lens group, and the third lens group, between the retracted condition and a telescopic condition.

FIG. 5 shows the positional relationship of first lens group 1, second lens group 2, and third lens group 3, under each configuration from the retracted to the extended configuration.

As described above, under the retracted configuration, third lens group 3 exists at the displaced position from the optical path (see FIG. 4). First lens group 1 and second lens group 2 are moved via cam barrel 14 from their retracted positions to the wide-angle ends and the telescopic ends, as shown in FIG. 5. When first lens group 1 and second lens group 2 position at the wide-angle range ends, third lens group 3 is driven to enter the optical path as described above, and further, to shift toward the subject side to engage with guide shaft 46, after which, third lens group 3 is stopped at predetermined position A. Then, the configuration shown by FIG. 3 is established and the preparation of image capturing is completed.

Additionally, as shown in FIG. 5, the position, where third lens group 3 enters the optical path and engages with guide shaft 46, is established to become a position where is not used for image capturing and is near the image detection element.

From the end of the wide-angle range to the end of the telescopic range, third lens group 3 is positioned as shown in FIG. 3, whereby focusing is performed, while third lens group 3 moves within the focusing area on the optical axis, as shown in FIG. 5.

Figure 6:
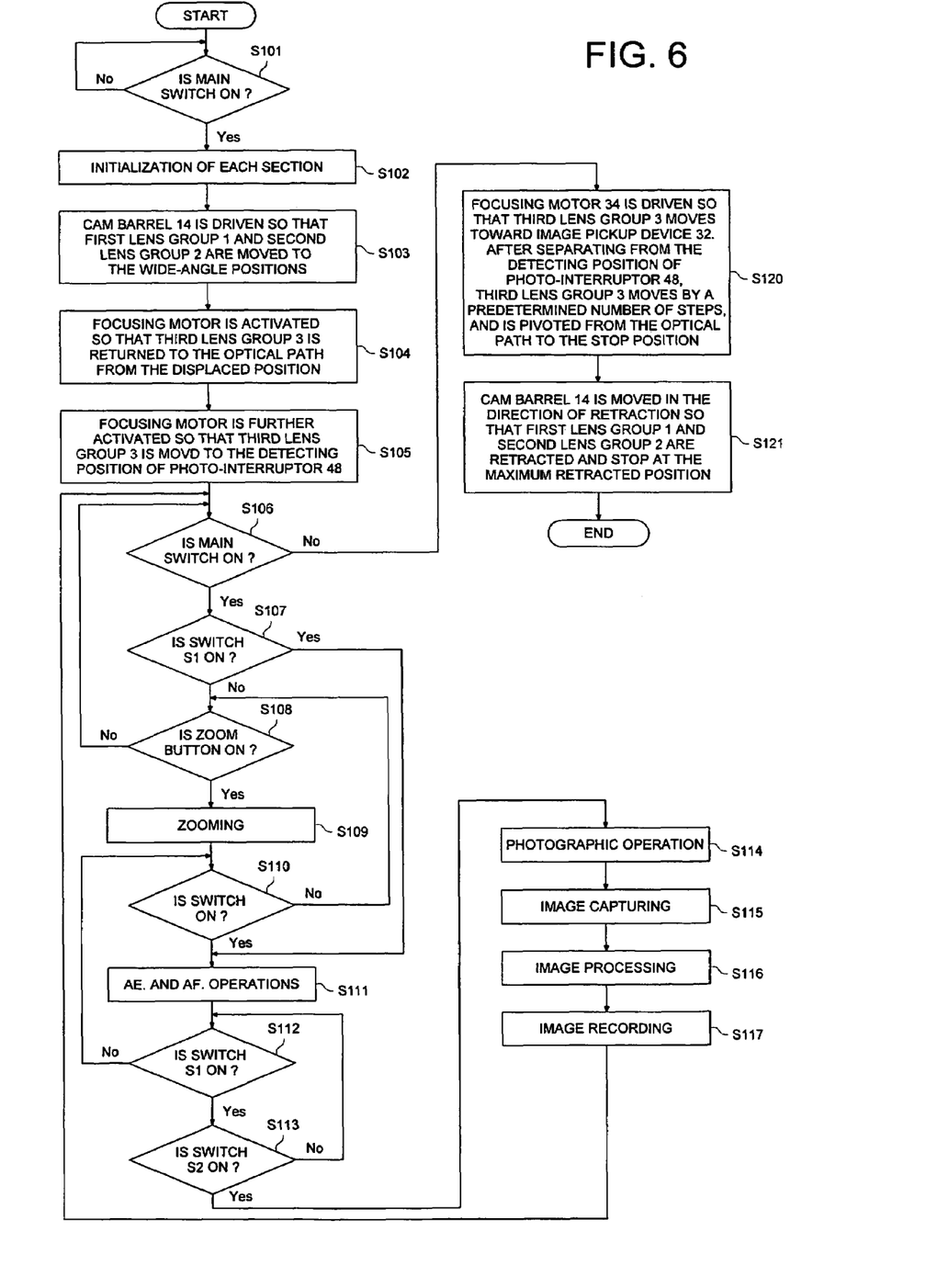
FIG. 6 is a flow chart of the operation of the image capturing mode of a camera which incorporates the lens unit relating to the present invention.

FIG. 6 is a flowchart of the operation of the image capturing mode of the camera incorporating lens unit 81 of the present invention. For this explanation, it is assumed that lens unit 81 of the camera has been retracted, and the image capturing mode has been set for the camera.

Firstly, the main switch of the camera is in the OFF condition. (Step S101). When the main switch is pressed to "ON" (Yes in Step S101), each section of the camera is electronically checked whether each section is in the initial configuration, and if not, the initialization of each section is conducted (Step S102). This step is conducted in cases in which the camera was not properly shut down, for example, when electrical power of the camera was stopped while in operation.

Next, cam barrel 14 is driven so that first lens group 1 and second lens group 2 are moved to the wide-angle positions respectively (Step S104). After which the focusing motor is activated so that third lens frame 18, that is, third lens group 3, is rotated, and is returned to the optical path from the displaced position (Step S104). Next, the focusing motor is further activated so that third lens frame 18 is engaged with guide shaft 46, and is moved to the detecting position of photo-interrupter 48 (Step S105). Lens unit 81 is now in the image capturing configuration.

After that, the main switch is again checked whether it is in the ON position (Step S106), if the main switch is ON (Yes in Step S106), switch S1 is checked whether it is in the ON condition (release button 83 is depressed half way) (Step S107), and if it is ON (Yes in Step S107), the procedure jumps to Step S111, so that AE and AF operations are performed.

If switch S1 is in the OFF position (No in Step S107), the zoom button is checked whether it is in the ON position (Step S108), and if the zoom button is OFF (No in Step S108), the procedure returns to Step S106. If the zoom button is ON (Yes in Step S108), zooming is conducted after the check of the wide angle or the telescopic direction. After the zoom button is moved to OFF, switch S1 is again checked whether it is ON (Step S110). If switch S1 is OFF (No in Step S110), the procedure returns to Step S108.

That is, Steps S106-S109 show the condition for waiting for the operation of any one of the main switch, the zoom switch and switch S1.

In Step S110, when switch S1 is turned ON (Yes in Step S110), AE and AF operations are performed (Step S11). The AE and AF operations drive the focusing motor to move third lens group 3 along the optical axis, capture the image at each position, check the captured image, and stop third lens group 3 at the optimal focus position, as well as determine the aperture value and shutter speed, based on the luminance of the subject.

After AE and AF operations are completed, switch S1 is again checked whether it is ON (Step S112), and if switch S1 is OFF (No in Step S112), the procedure returns to Step S110. If switch S1 is ON (Yes in Step S112), the procedure stands by until switch S2 is turned ON (Step S113).

When switch S2 is turned ON, photographic operation is started based on the aperture value and the shutter speed determined in step S111 (Step S114), that is, the image is captured (Step S115), the image is processed based on the various processes, and the image is recorded onto a recording memory for storing the image data (Step S117), resulting in production of the image, after which the procedure returns to Step S106.

On the other hand, in Step S106, when "ON" of the main switch is released (No in Step S106), focusing motor 34 is driven so that third lens group 3 moves toward image pickup device 32, and after separating from the detecting position of photo-interrupter 48 being the position detecting member, third lens group 3 moves through a predetermined number of steps and then stops there (Step S120). The predetermined number of steps, determined via measuring each lens unit, is used for driving third lens frame 18 in the procedures, in which after third lens frame 18 is separated from the detecting position of photo-interrupter 48, third lens frame 18 is disengaged from guide shaft 46, and pivoted to displace from the optical path, after which, third lens frame 18 shifts toward image pickup device 32 under the displaced condition. Due to this, third lens frame 18 can be displaced from the optical path. Next, cam barrel 14 is retracted in the direction of retraction so that first lens group 1 and second lens group 2 are retracted and stop at the maximum retracted position (Step S121).

The above described procedures include the operations not only from the retracted configuration to the image capturing configuration, but also from the image capturing configuration to the retracted configuration, under the image capturing mode of the camera incorporating lens unit 81 related to the present invention. Additionally, in the above description, by the OFF operation of the main switch, third lens group 3 is displaced from the optical path, wherever first lens group 1 and second lens group 2 may be positioned. Next, first lens group 1 and second lens group 2 are moved and retracted. However, it is also possible to structure the system in such way that after first lens group 1 and second lens group 2 are firstly moved into the wide-angle range, third lens group 3 is displaced from the optical path, after which, first lens group 1 and second lens group 2 are again retracted.

Figure 7:
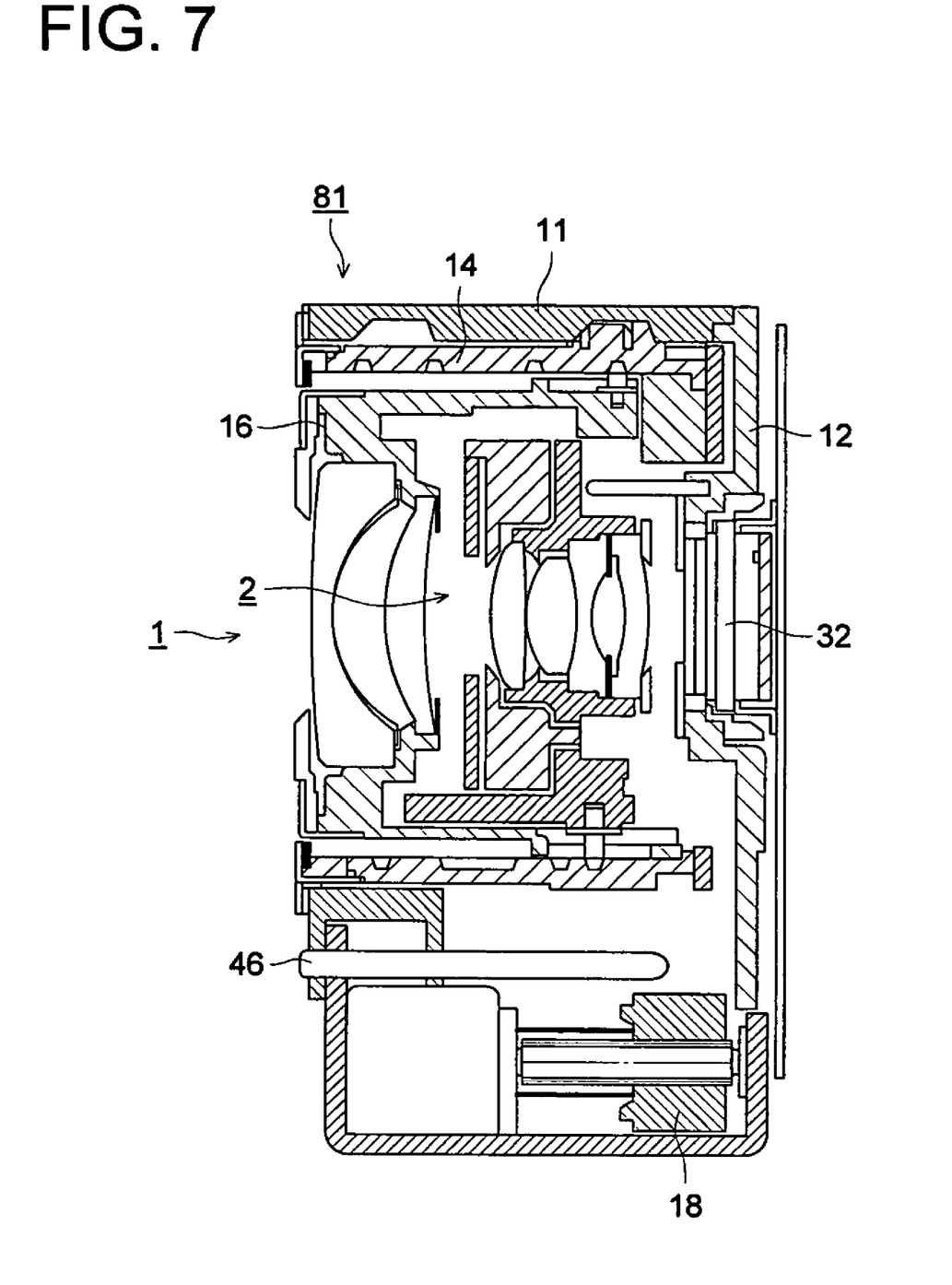
FIG. 7 is a cross sectional view of the retracted condition of the lens unit relating to the present invention.

FIG. 7 is a sectional drawing of the retracted condition of lens unit 81 related to the present invention.

Under the retracted condition, third lens frame 18 is disengaged from guide shaft 46, and displaced from the optical path. Both first lens group 1 mounted on first lens frame 16 and second lens group 2 mounted on second lens frame 17 are located in front of image pickup device 32. That is, in the retracted configuration, lens unit 81 can be shortened by the thickness of third lens group 3.

As described above, while the first and second lens frames engage the guide member, the first and second lens groups can be moved along the optical axis by the lead screw, and while the third lens frame is disengaged from the guide member, the third lens group can be rotated by the lead screw, and can be displaced from the optical path. Accordingly, without a new actuator mechanism and additional space, as well as without additional cost for production, and with the structure of a conventional lens unit, a lens unit, which can be retracted to less than conventional ones, can be obtained by the present invention.

In the above description, in order to guide the lens frames straightly along the optical path, a guide shaft is used, it also possible to use a plate or any other member in the lens barrel. Further, a focusing lens is used for the lens group which is displaced from the optical path, however, the other lens groups included in the lens unit can also be used.

Based on the present invention, without changing the basic structure of the conventional lens unit, it is possible to displace the predetermined lens groups from the optical path, and further, without a new actuator, additional space, as well as additional cost, it is possible to obtain a lens unit wherein when the lens groups to be displaced are located in the optical path, optical axial accuracy is correctly maintained, and when the lens units are retracted, the length of the lens unit is decreased.

What is claimed is:

1. A lens unit, comprising:
    a subject side lens group supporting frame comprising a subject side lens group defining an optical imaging axis;
    an image side lens group supporting frame comprising an image side lens group disposed in optical alignment with the optical imaging axis;
    an engaging section in engagement with said image side lens group supporting frame and operable for moving the image side lens group supporting frame along a travel range defined parallel to said optical imaging axis;
    a guide member disposed for engagement with said image side lens group supporting frame over a first portion of said travel range of the image side lens group supporting frame;
    a driving section operable for rotating said engaging section to move the image side lens group through said travel range such that the image side lens group is maintained in optical alignment with the optical imaging axis in said first portion of the travel range and the image side lens group is displaced out of optical alignment with the optical imaging axis in a second portion of the travel range; and a stopper guide member disposed for contact with said image side lens group supporting frame when the image side lens group moves along said first portion of the travel range with the image side lens group in optical alignment with the optical imaging axis, and so that the image side lens group supporting frame separates from the stopper guide member in said second portion of the travel range with the image side lens group displaced out of optical alignment with the optical imaging axis.

2. The lens unit of claim 1, wherein the image side lens group is moved along said first portion of the travel range for focusing.

3. The lens unit of claim 1, wherein the image side lens group is displaced out of optical alignment with the optical imaging axis from a position between a focal plane and a position for photographing.

4. A photographic camera including the lens unit of claim 1.

5. The lens unit of claim 1, wherein the subject side lens group is retracted into a space from which the image side lens group has been displaced.

6. The lens unit of claim 1, wherein the guide member disengages from the image side lens group supporting frame is said second portion of the travel range so that rotation of the engaging section causes the image side lens supporting frame to separate from the stopper guide member to displace the image side lens group out of optical alignment with the optical imaging axis.

7. The lens unit of claim 1, wherein return of the displaced image side lens group to the optical imaging axis moves the image side lens group supporting frame into contact with the stopper guide member to realign the image side lens group with the optical imaging axis.

* * * * *